US012620636B2

(12) United States Patent
Mondoha et al.

(10) Patent No.: US 12,620,636 B2
(45) Date of Patent: May 5, 2026

(54) METHOD FOR MONITORING AND CONTROLLING A BATTERY PACK, SYSTEM FOR MONITORING AND CONTROLLING A BATTERY PACK, BATTERY MANAGEMENT SYSTEM

(71) Applicant: Robert Bosch GmbH, Stuttgart (DE)

(72) Inventors: Abouzede Mondoha, Stuttgart (DE); Simon Tippmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 691 days.

(21) Appl. No.: 17/978,419

(22) Filed: Nov. 1, 2022

(65) Prior Publication Data

US 2023/0136580 A1 May 4, 2023

(30) Foreign Application Priority Data

Nov. 2, 2021 (DE) .......................... 102021212315.5

(51) Int. Cl.
| | |
|---|---|
| *H01M 10/42* | (2006.01) |
| *B60L 58/10* | (2019.01) |
| *H01M 10/04* | (2006.01) |
| *H01M 10/48* | (2006.01) |

(52) U.S. Cl.
CPC ........... *H01M 10/425* (2013.01); *B60L 58/10* (2019.02); *H01M 10/0445* (2013.01); *H01M 10/482* (2013.01); *H01M 2010/4271* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 12,395,083 B2 * | 8/2025 | Nakano | H02M 3/1586 |
| 2017/0361832 A1 | 12/2017 | Schwartz et al. | |
| 2018/0131204 A1 * | 5/2018 | Weicker | H02J 7/14 |
| 2019/0052119 A1 | 2/2019 | Hendrix et al. | |
| 2019/0196427 A1 | 6/2019 | Kaucic et al. | |
| 2019/0273389 A1 * | 9/2019 | Kahnt | H02J 7/0047 |
| 2020/0086748 A1 * | 3/2020 | Bolger | H02J 7/00 |
| 2020/0262308 A1 | 8/2020 | Sasahara | |
| 2020/0293103 A1 * | 9/2020 | Stanley | G06F 1/329 |
| 2020/0381923 A1 * | 12/2020 | Chow | H01M 10/4207 |
| 2021/0305653 A1 * | 9/2021 | Liu | H01M 50/519 |

(Continued)

*Primary Examiner* — Scott J. Chmielecki
(74) *Attorney, Agent, or Firm* — Michael Best & Friedrich LLP

(57) ABSTRACT

A method for monitoring and controlling a vehicle battery pack that includes a plurality of battery cells. The battery cells each include a switching unit which serves to connect and disconnect the respective battery cells. Pack information of the battery pack is acquired, a pack voltage of the battery pack is calculated on the basis of the cell voltages and a current activation pattern for actuating the switching units. An electrical power requirement of the vehicle is predicted based on GPS information. A state of the battery pack is estimated based on the pack information and the current activation pattern and an optimized activation pattern for actuating the switching units on the basis of the predicted electrical power requirement and the estimated state of the battery pack is calculated. The switching units of the respective battery cells are actuated according to the optimized activation pattern.

10 Claims, 4 Drawing Sheets

(56)           References Cited

U.S. PATENT DOCUMENTS

2021/0339650 A1*  11/2021  Hashimoto ............. B60L 50/60
2022/0242272 A1*   8/2022  Okamoto ................ B60L 58/21
2022/0349718 A1*  11/2022  Nardimon ............. B62D 51/04

* cited by examiner

METHOD FOR MONITORING AND CONTROLLING A BATTERY PACK, SYSTEM FOR MONITORING AND CONTROLLING A BATTERY PACK, BATTERY MANAGEMENT SYSTEM

BACKGROUND OF THE INVENTION

The invention relates to a method and a system for monitoring and controlling a battery pack of a vehicle which comprises a plurality of battery cells interconnected in parallel and/or in series, the battery cells each comprising a switching unit which serves to connect and disconnect the respective battery cells separately.

The invention further relates to a battery management system and a battery system.

The development of electrified vehicles aims to improve the energy efficiency of automotive systems and at the same time to reduce or even eliminate pollutant emissions. Currently, lithium ion batteries are the most frequently used energy storage system in electrified vehicles, because they provide a high energy density with respect to mass and volume, at a smaller size. A plurality of individual lithium ion cells are connected in series and/or in parallel in order to cover the energy and power requirement of the drive. Such a configuration leads to an unavoidable imbalance of the lithium ion cells, which in turn affects the power and service life of the battery pack. In this case, three linked types of imbalances occur within a battery pack. The imbalance of the state of charge (SoC) due to a non-uniform manufacturing process, is also known as a deviation of the remaining amount of energy stored in each lithium ion cell. This imbalance has a direct effect on the cell voltages and thus on the power. The thermal imbalance is caused by the internal resistance of the cells, the temperature gradients in the cooling system, and the position of the cells in the battery pack. The imbalance of the state of health (SoH) indicates the degree of degradation of the individual lithium ion cells within the battery pack.

However, lithium ion batteries are complex electrochemical devices having a pronounced nonlinear behavior which depends on various internal and external conditions. Lithium reacts very sensitively to operating conditions and the environmental conditions imposed on it. The temperature is one of the most important factors that causes imbalances in the battery pack. Charging or discharging lithium ion batteries in an electrified vehicle generates strong electrical currents, which in turn leads to significant heating. The increase in temperature can be critical for the operational safety of the battery pack, and in any case leads to a faster aging of the lithium ion cells. Furthermore, the thermal imbalance leads to heterogeneity of the power delivered by each individual lithium ion cell and reduces the overall power of the battery pack.

According to the prior art, the imbalance of the state of charge can be treated, for example, by the incorporation of passive or active electrical circuits into the battery configuration. Complex architectures are proposed for heat management, in order to cool the battery pack. These architectures focus primarily on the design of the cooling system, which can be passive or active. The cooling system aims to keep the temperature of the battery pack below a target value and to ensure uniform temperature distribution across all lithium ion cells within the battery pack. In the case of too high a temperature, the proposed solution consists in reducing the electrical power exchanged with the battery pack. With respect to the state of health, constraints are considered in order to reduce the degradation of the battery, such as limiting the charging current in order to avoid the lithium plating process.

The document US 2019/0196427 A1 describes a system and a method for controlling a dispatch operation of one or more energy storage units in an energy storage system.

The document US 2017/0361832 A1 describes a system and a method for controlling and operating a hybrid vehicle. In this case, a power requirement of the hybrid vehicle is predicted by a power flow control system on the basis of changing conditions during operation of the hybrid vehicle.

SUMMARY OF THE INVENTION

A method for monitoring and controlling a battery pack of a vehicle, in particular an electrically driven vehicle, such as hybrid and electric vehicles, is proposed. In this case, the battery pack has a plurality of battery cells which are interconnected in parallel and/or in series. In this case, the battery cells each comprise a switching unit which serves to connect and disconnect the respective battery cells separately.

When the method according to the invention is carried out, pack information of the battery pack is acquired. In this case, the pack information comprises at least cell voltages and cell temperatures of the respective battery cells, and a pack current. In the event that a temperature sensor is not assigned to each of the battery cells, the cell temperature can be estimated by means of temperature measurement at different positions in the battery pack. In this case, the acquisition of the pack current can take place by measuring or calculating. For example, the battery pack comprises a plurality of strings of battery cells connected in parallel, which are interconnected in series in the respective strings. In this case, the currents flowing in the respective strings can be measured, and the pack current can thus be calculated. In contrast, in the event that the battery pack comprises only one string of battery cells, the pack current can be measured directly. The pack information can also comprise further parameters of the battery pack and/or of the respective battery cells, such as pack voltage/temperature of the battery pack and cell current of the respective battery cells.

Subsequently, a pack voltage of the battery pack is calculated on the basis of the cell voltages of the respective battery cells and a current activation pattern for actuating the switching units. The activation pattern for actuating the switching units is a binary matrix, which describes the switching states of the switching units of the respective battery cells, i.e. whether the respective battery cells are connected or disconnected.

An electrical power requirement of the vehicle is predicted on the basis of information which is acquired by a global positioning system (GPS) module of the vehicle. Modern vehicles have a GPS module that uses the GNSS (Global Navigation Satellite System) network. This allows access to information about speed, location, direction and time of the vehicle. Therefore, the GPS module aids in route planning, by monitoring driving and traffic navigation. This information can also be used to estimate the future dynamic behavior of the vehicle. Thus, a mechanical power requirement of the vehicle within a determined time horizon can be predicted during a journey. Accordingly, an electrical power requirement can be predicted on the basis of the predicted mechanical power requirement and an efficiency of the powertrain of the vehicle.

A state of the battery pack is estimated on the basis of the pack information, inter alia the cell voltages and temperatures of the respective battery cells and the pack current, and the current activation pattern. In this case, the state of the battery pack comprises a plurality of state parameters, such as the state of charge (SoC), the state of health (SoH) and the temperature distribution of each individual battery cell and the battery pack. In this case, the state of the battery pack can be estimated by means of models of battery cells or battery packs. The models of battery cells or battery packs are understood to mean, inter alia, models which are formed using empirical modeling technology, such as an electrical equivalent circuit model (ECM), which uses electrical circuits to simulate the behavior of a specific system, thermal network model, and semi-empirical aging model.

An optimized activation pattern for actuating the switching units is then calculated on the basis of the predicted electrical power requirement and the estimated state of the battery pack.

The switching units of the respective battery cells are actuated according to the optimized activation pattern for actuating the switching units for connecting and disconnecting the respective battery cells.

Preferably, the optimized activation pattern is calculated by means of model predictive control (MPC) or receding horizon control (RHC). The model predictive control is preferably carried out based on Pareto optimization, which is also referred to as multi-objective optimization. In this case, consideration weightings are used, which indicate the relative importance of the individual objectives. These consideration weightings are selected such that the desired compromise among all objectives is achieved.

Since the activation pattern is a binary matrix, the optimization problem may be formulated as a combinatorial optimization problem. There are several optimization algorithms in the literature for solving this problem, such as Basic Open Source Nonlinear Mixed INteger (BONMIN) solvers.

In model predictive control, a simulation model of the battery pack, such as an equivalent circuit model, is used, which aims to estimate the electrical, thermal and aging behavior of the battery pack. The simulation model can be designed, for example, as a Thevenin model.

A system for monitoring and controlling a battery pack of a vehicle, in particular an electrically driven vehicle, is also proposed. In this case, the battery pack has a plurality of battery cells which are interconnected in parallel and/or in series. In this case, the battery cells each comprise a switching unit which serves to connect and disconnect the respective battery cells separately.

The system is designed to carry out the method proposed according to the invention. In this case, the system comprises: a GPS module of the vehicle; a power prediction module which is designed to predict, on the basis of information acquired by the GPS module, an electrical power requirement of the vehicle; a state estimation module which is designed to estimate the state of the battery pack on the basis of the pack information; and a control device which is designed to calculate an optimized activation pattern for actuating the switching units on the basis of the predicted electrical power requirement and the estimated state of the battery pack, and to actuate the switching units of the respective battery cells according to the optimized activation pattern for actuating the switching units for connecting and disconnecting the respective battery cells. In this case, the power prediction module can be a part of a vehicle control unit (VCU) or a part of a battery management system. However, the power prediction module can also be designed as a separate device.

Furthermore, a battery management system for monitoring and controlling a battery system of a vehicle, in particular an electrically driven vehicle, is proposed. In this case, the battery system comprises at least one battery pack having a plurality of battery cells interconnected in parallel and/or in series. In this case, the battery cells each comprise a switching unit which serves to connect and disconnect the respective battery cells separately.

The battery management system is designed to carry out the method proposed according to the invention. In this case, the battery management system comprises a state estimation module which is designed to estimate the state of the at least one battery pack on the basis of pack information, and a control device which is designed to calculate an optimized activation pattern for actuating the switching units on the basis of the predicted electrical power requirement and the estimated state of the at least one battery pack, and to actuate the switching units of the respective battery cells according to the optimized activation pattern for actuating the switching units for connecting and disconnecting the respective battery cells.

The battery management system preferably comprises a power prediction module which is designed to predict an electrical power requirement of the vehicle on the basis of information acquired by the GPS module.

A further aspect of the invention relates to a battery system of a vehicle, in particular an electrically driven vehicle. In this case, the battery system comprises at least one battery pack having a plurality of battery cells interconnected in parallel and/or in series. In this case, the battery cells each comprise a switching unit which serves to connect and disconnect the respective battery cells separately.

The battery system is designed to carry out the method proposed according to the invention. Additionally or alternatively, the battery system comprises the battery management system proposed according to the invention.

The at least one battery pack preferably comprises one or more strings of battery cells, which are interconnected in series within the respective strands.

Preferably, the switching units each comprise a first switching element and a second switching element, the first switching element and the corresponding battery cell forming a series circuit, and the second switching element being connected in parallel with the series circuit.

Preferably, the first and second switching elements are each designed as semiconductor switches, for example MOSFET or IGBT.

Furthermore, the invention relates to a vehicle, in particular an electrically driven vehicle, which is designed to carry out the method proposed according to the invention, and/or which comprises the system proposed according to the invention, the battery management system proposed according to the invention, and/or the battery system proposed according to the invention.

Advantages of the Invention

The invention provides a method and a system for optimal power and aging management of a battery pack, which is supplemented by switching units in order to vary the number of connected battery cells. These switching units provide additional degrees of freedom for controlling each cell within the battery pack by activation or deactivation.

By way of the solution proposed according to the invention, the power and service life of battery cells or battery packs are optimized. The proposed intelligent monitoring uses the advantages of modern vehicle equipment. It uses the GPS module of the vehicle to predict the future behavior of the vehicle and thus the optimal activation scheme of the battery cells within the battery pack. The monitoring approach is based on model predictive control for optimizing the switching strategy of the battery cells and at the same time maximizing the power and increasing the service life of the battery pack. The thermal, power and aging problems can be overcome by way of the monitoring strategy proposed according to the invention. The solution proposed according to the invention also delays the power reduction phase due to excess temperature.

The invention can be used both for completely electrified vehicles and for hybrid vehicles. Under high-voltage network architectures, for example in the case of fully electrified vehicles, the intelligent monitoring would maximize energy recovery during regenerative braking, and at the same time the autonomy, power and service life of the battery cells or battery pack.

In addition to the advantages already mentioned, the invention would also bypass the voltage limit for 48 V mild hybrid systems. The latter are limited to 60 V, above which the regulations for high-voltage power supply systems apply. As a result, the number of battery cells that can be connected in series is limited by nature, which in turn restricts the available battery power by limiting the maximum current due to thermal and aging-related limitations. This intelligent monitoring of the battery pack would maximize the battery power in that the switching units are actuated optimally, and thus enable efficient energy management.

In addition, it would enable the use of consideration weightings to define the behavior of the battery over time. Thus, for example, the power/service life could be maximized at the expense of the service life/power, or an equilibrium between the two could be maintained.

BRIEF DESCRIPTION OF THE DRAWINGS

Embodiments of the invention are explained in greater detail with reference to the drawings and the following description.

In the drawings.

DETAILED DESCRIPTION

In the following description of the embodiments of the invention, identical or similar elements are denoted by the same reference signs, a repeated description of these elements in individual cases being dispensed with. The figures show the subject matter of the invention only schematically.

Figure 1:
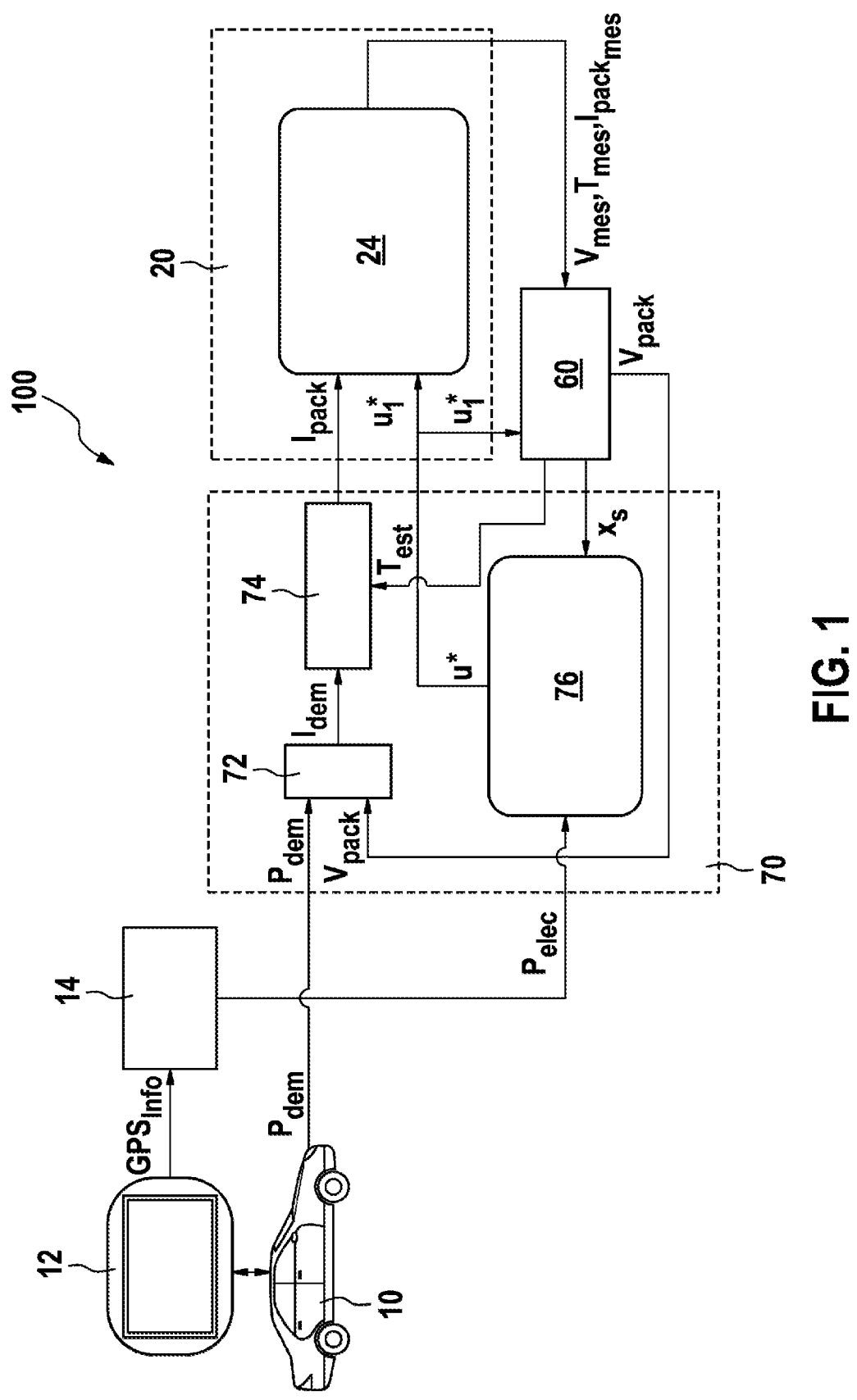
FIG. 1 is a schematic view of a system according to the invention for monitoring and controlling a battery pack.

FIG. 1 is a schematic view of a system 100 according to the invention for monitoring and controlling a battery pack 24 of a vehicle 10.

Figure 2:
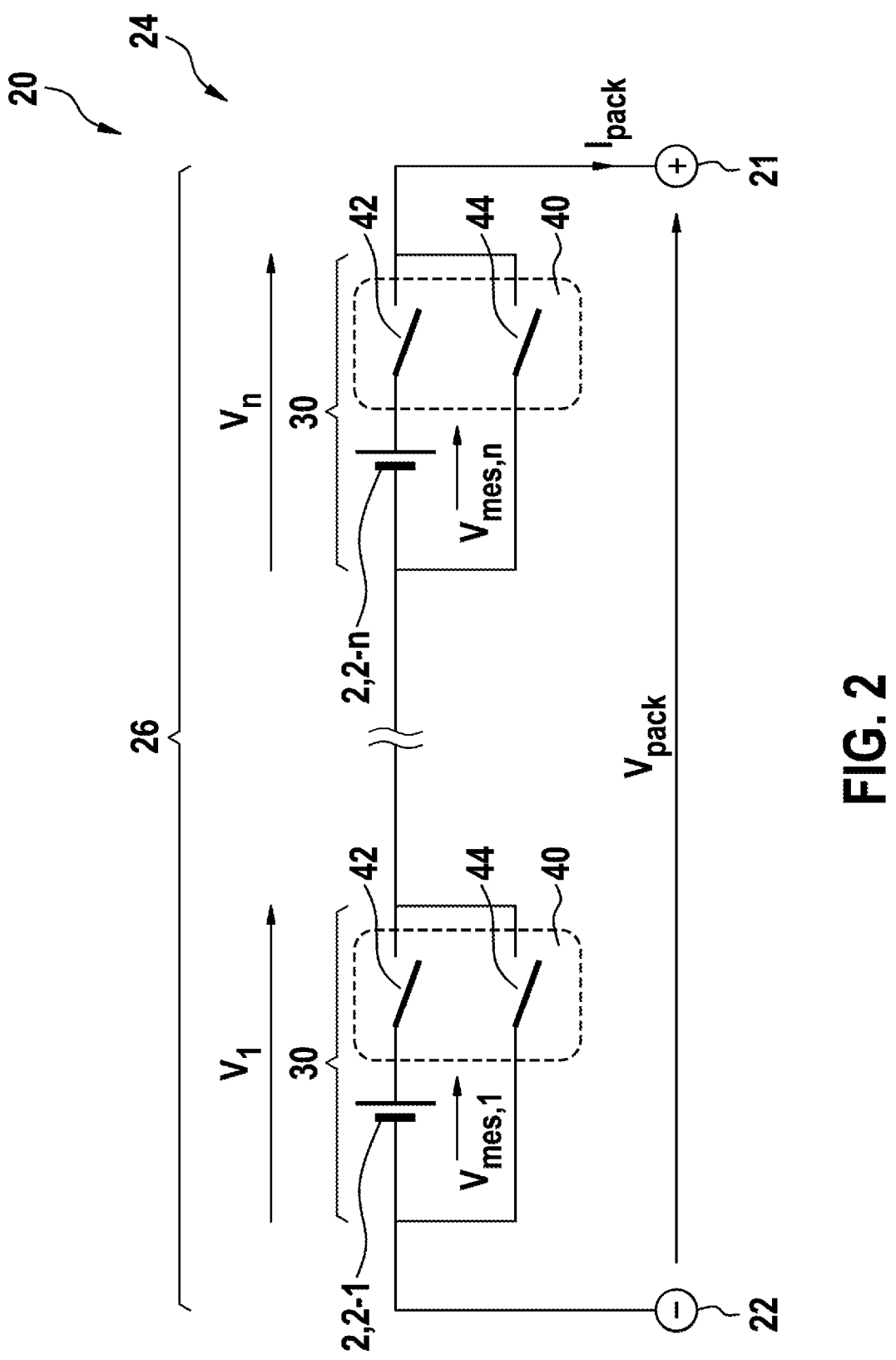
FIG. 2 is a schematic view of a battery pack of a battery system according to the invention according to a first embodiment.
Figure 3:
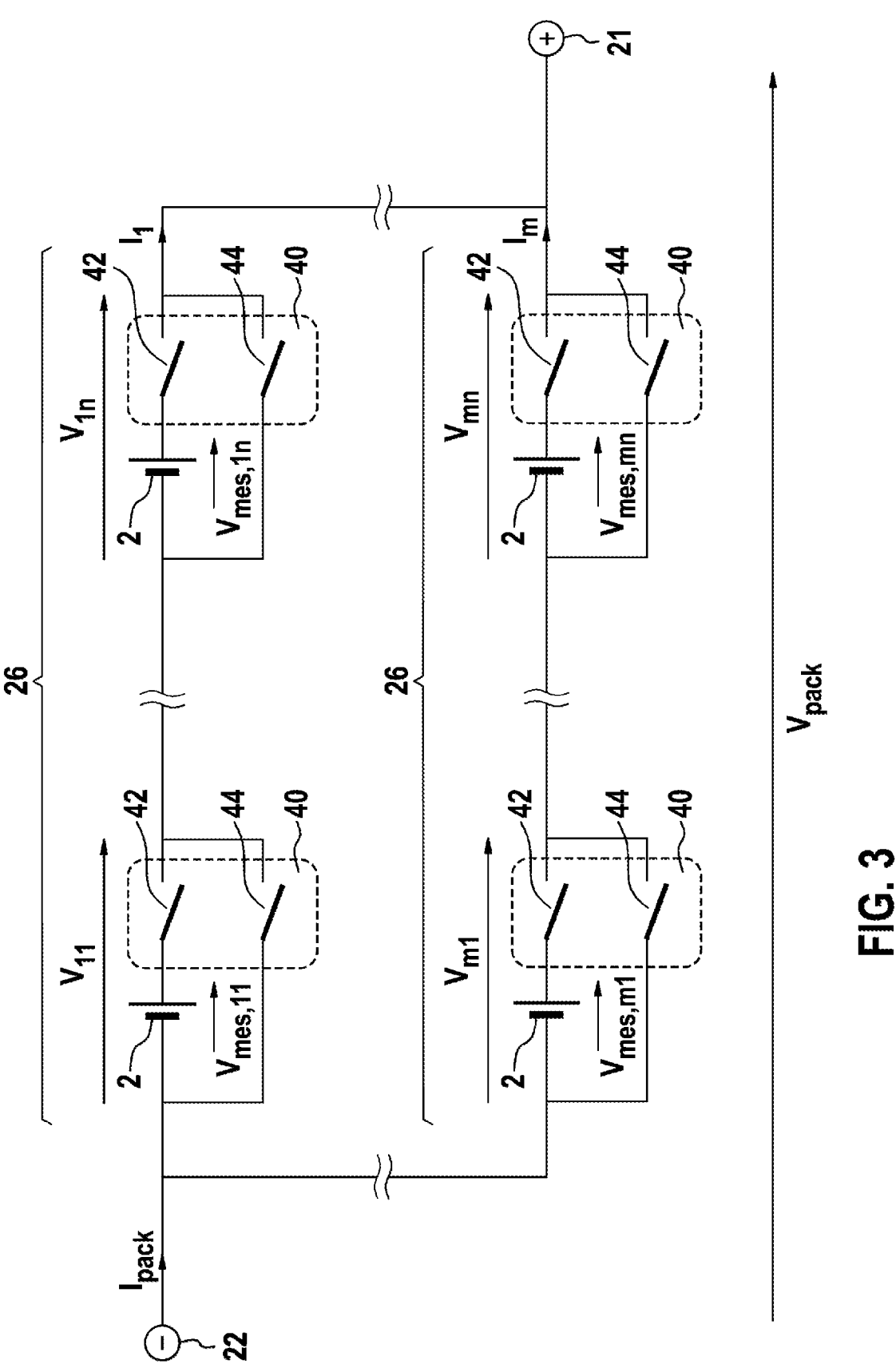
FIG. 3 is a schematic view of a battery system according to the invention according to a second embodiment.

It can be seen in FIG. 1 that the vehicle 10 comprises a GPS module 12 and a battery system 20 which comprises the battery pack 24 (cf. FIGS. 2 and 3). In this case, the battery pack 24 comprises a plurality of battery cells 2 (see FIGS. 2 and 3) interconnected in parallel and/or in series. In this case, the battery cells 2 each comprise a switching unit 40 (cf. FIGS. 2 and 3), which serves to connect and disconnect the respective battery cells 2 separately.

In this case, the system 100 according to the invention comprises the GPS module 12 of the vehicle 10, a power prediction module 14, a state estimation module 60, and a control device 70.

When the method according to the invention is carried out, pack information of the battery pack 24 is acquired. In this case, the pack information comprises at least cell voltages $V_{mes}$, cell temperature $T_{mes}$ of the respective battery cells 2, and a pack current $I_{pack,mes}$. In this case, pack information can also comprise further parameters of the respective battery cells 2 and/or of the battery pack 24.

Subsequently, a pack voltage $V_{pack}$ of the battery pack 24 is calculated on the basis of the measured cell voltages $V_{mes}$ of the respective battery cells 2 and a current activation pattern u for actuating the switching units 40. The activation pattern u for actuating the switching units 40 is a binary matrix which describes the switching states of the switching units 40 of the respective battery cells 2, i.e. whether the respective battery cells 2 are connected or disconnected.

Using information $GPS_{Info}$ which is acquired by the GPS module 12 of the vehicle 10, an electrical power requirement $P_{elec}$ of the vehicle 10 is predicted. Modern vehicles have a GPS module 12 which uses the GNSS network. This allows access to information $GPS_{Info}$ about speed, location, direction, and time of the vehicle 10. Therefore, the GPS module 12 aids in route planning by monitoring driving and traffic navigation. This information $GPS_{Info}$ can also be used to estimate the future dynamic behavior of the vehicle 10. It is thus possible to predict a mechanical power requirement $P_{mech}$ of the vehicle 10 within a determined time horizon T during a journey.

In this case, the following applies:

$$P_{mech} = F_{mech} \cdot V_{veh}$$

In this case, $F_{mech}$ is the mechanical force acting on the vehicle 10 within the determined time horizon T, and $v_{veh}$ is the speed of the vehicle 10 during the determined time horizon T. The two variables can be estimated with the aid of the information $GPS_{Info}$ acquired by the GPS module 12.

During the determined time horizon T, the information $GPS_{Info}$ is acquired by the GPS module 12 in a plurality of time steps dt. In this case, a prediction horizon H is defined as follows:

$$H = T/dt$$

After acquisition of the information $GPS_{Info}$ by the GPS module 12, the following variables are obtained:

$$v_{veh} = [v_{veh,1}, v_{veh,2}, \ldots, v_{veh,H}]$$

and $$F_{mech} = [F_{mech,1}, F_{mech,2}, \ldots, F_{mech,H}]$$

The following then applies:

$$P_{mech} = [P_{mech,1}, P_{mech,2}, \ldots, P_{mech,H}] =$$
$$[F_{mech,1} \cdot v_{veh,1}, F_{mech,2} \cdot v_{veh,2}, \ldots, F_{mech,H} \cdot v_{veh,H}]$$

Accordingly, the electrical power requirement $P_{elec}$ can be predicted on the basis of the predicted mechanical power requirement $P_{mech}$ and an efficiency $\eta_{pwt}$ of the powertrain of the vehicle 10.

In this case, the following applies:

$$P_{elec} = \eta_{pwt} \cdot P_{mech}$$

The predicted electrical power requirement $P_{elec}$ can thus be calculated as follows:

$$P_{elec} = [\eta_{pwt} \cdot P_{mech,1}, \eta_{pwt} \cdot P_{mech,2},$$
$$\dots, \eta_{pwt} \cdot P_{mech,H}] = [P_{elec,1}, P_{elec,2}, \dots, P_{elec,H}]$$

In order to control the current flowing in the battery pack 24, a pack current requirement $I_{dem}$ of the battery pack 24 is calculated on the basis of the actual electrical power requirement $P_{dem}$ and the calculated pack voltage $V_{pack}$. In this case, the actual electrical power requirement $P_{dem}$ represents an instantaneous power requirement, which is time-continuous and can be calculated by means of another control device, such as a vehicle control unit or a control device for controlling an electric motor of the vehicle 10.

In this case, the following applies:

$$I_{dem} = \frac{P_{dem}}{V_{pack}}$$

In this case, the calculation of the pack power requirement $I_{dem}$ is carried out with the aid of a divisor 72 of the control device 70. By means of a current and temperature monitoring module 74, this pack current requirement $I_{dem}$ is limited to a permissible pack current $I_{pack}$ which flows through the battery pack 24 when the pack current requirement $I_{dem}$ is too high, for example with regard to a packing temperature Test which is estimated using measured cell temperatures $T_{mes}$ and is also a state parameter of the battery pack 24. In this case, the estimated pack temperature Test can be a plurality of temperature values which are estimated from a temperature measurement. By means of the current and temperature monitoring module 74, the current and the temperature of the battery pack 24 are thus monitored in order to ensure the safety of the battery pack 24 and a rapid degradation. In this case, a current and/or temperature control, for example current/heat derating and/or cooling temperature control, is carried out.

In this case, a state $x_s$ of the battery pack 24 is estimated on the basis of the pack information of the battery pack 24, inter alia the cell voltages $V_{mes}$ and cell temperatures $T_{mes}$ of the respective battery cells 2, the pack current $I_{pack,mes}$, and the current activation pattern u. In this case, the state $x_s$ of the battery pack 24 comprises, for example, the state of charge, the state of health and the temperature distribution of each individual battery cell 2 and the battery pack 24. In this case, the state $x_s$ of the battery pack 24 can be estimated by means of models of battery cells 2 or battery packs 24.

The estimation of the state $x_s$ of the battery pack 24 is performed with the aid of the state estimation module 60. In this case, the state of charge, the state of health and the temperature distribution of the individual battery cells 2 and of the battery pack 24 are estimated on the basis of models of the battery cell 2 and of the battery pack 24. The pack voltage $V_{pack}$ is also calculated by means of the state estimation module 60.

An optimized activation pattern u* for actuating the switching units 40 is calculated with the aid of the control device 70 or the model predictive control 76, on the basis of the predicted electrical power requirement $P_{elec}$ and the estimated state $x_s$ of the battery pack 24. In this case, the optimized activation pattern u* over the determined time horizon T or the prediction horizon H is defined as follows:

$$u^* = [u_1^*, u_2^*, \dots, u_H^*]$$

The switching units 40 of the respective battery cells 2 are actuated according to the optimized activation pattern u* for actuating the switching units 40 for connecting and disconnecting the respective battery cells 2.

When estimating the state $x_s$ of the battery pack 24, the following equations apply:

$$x_s = f_{est}(V_{mes}, T_{mes}, I_{pack,mes}, u_1^*)$$

and $$V_{pack} = g_{est}(V_{mes}, u_1^*)$$

In this case, $f_{est}$ and $g_{est}$ are the functions which use the measurements in order to estimate the state $x_s$ of the battery pack 24 or the pack voltage $V_{pack}$ of the battery pack 24. In this case, $$u_1^*$$

is the first optimized activation pattern which is calculated during the model predictive control 76 and applied to the battery pack 24 as a current activation pattern u for further calculation according to the regressive horizon.

FIG. 2 shows a schematic view of a battery pack 24 of a battery system 20 according to the invention according to a first embodiment, while FIG. 3 shows a schematic view of a battery pack 24 of a battery system 20 according to the invention according to a second embodiment.

FIG. 2 shows that the battery pack 24 has a positive pole 21, a negative pole 22, and a string 26 of a number n of battery cells 2. In the present case, in order to simplify the illustration, only two battery cells 2, namely a first battery cell 2-1 and an nth battery cell 2-n, are shown in FIG. 2. In this case, the battery cells 2 are connected in series.

The battery cells 2 each have a switching unit 40, which comprises a first switching element 42 and a second switching element 44, the first switching element 42 and the corresponding battery cell 2 forming a series circuit 30, and the second switching element 44 being connected in parallel with the series circuit 30. In this case, the first and second switching elements 42, 44 can in each case be designed as semiconductor switches, for example MOSFET or IGBT. In this case, only one of the two switching elements 42, 44 within a switching unit 40 may be closed at a certain time during operation of the battery pack 24, in order to prevent a short circuit of the battery cell 2. In the present case, an ideal switching behavior, i.e. undelayed and completely synchronous, and a resistance of zero during current conduction, are assumed.

FIG. 3 shows that the battery pack 24 has a number m of strings 26 connected in parallel, each comprising a number n of battery cells 2 connected in series. As shown in FIG. 3, the battery cells 2 each comprise a switching unit 40, which has a first switching element 42 and a second switching element 44. In this case, the acquired pack current $I_{pack,mes}$ contained in the pack information can be calculated by adding string currents $I_1$ to $I_m$ which flow in the respective strings 26 and are measured directly.

When the method according to the invention is carried out with the aid of the battery pack 24 shown in FIG. 2 and FIG. 3, the pack voltage $V_{pack}$ of the battery pack 24 is calculated, on the basis of the measured cell voltages $V_{mes}$ of the respective battery cells 2 contained in the acquired pack information and a current activation pattern u for actuating the switching units 40, as follows:

$$V_{ki}(t) = s_{s,ki}(t) \cdot V_{mes,ki}(t)$$

$$V_{pack}(t) = \sum_{i=1}^{n} V_{ki}(t)$$

In this case, $V_{ki}$ is the usable cell voltage of the individual battery cells 2, with $k \in \{1, 2, \ldots, m\}$, m being the number of strings 26 connected in parallel, and $i \in \{1, 2, \ldots, n\}$, n being the number of battery cells 2, connected in series, of the respective strings 26, and $s_{s,\,ki}$ the switching state of the first switching element 42 or the battery cell 2. Since a battery cell 2 only delivers a usable cell voltage $V_{ki}$ when the first switching element 42 is closed, the switching state of a switching unit 40 can thus be described by the switching state $s_{s,ki}$ of a first switching member 42. Since each of the first switching elements 42 can be only closed or opened, the first switching element 42 can be modeled having its switching state $s_{s,ki}$ as a binary variable, the following applying:

$$s_{s,ki} \in \{0,1\}$$

In this case, the following also applies:

$$s_{p,ki} \in \{0,1\}$$

In this case, $s_{p,ki}$ is the switching state of the second switching element 44.

Since the battery pack 24 shown in FIG. 2 comprises only one string 26, the usable cell voltages are denoted $V_1$ to $V_n$, and the measured cell voltages are denoted $V_{mes,1}$ to $V_{mes,n}$.

As stated above, the activation pattern u for actuating the switching units 40 is a binary matrix. The activation pattern u can be described using the following formula:

$$u = \begin{bmatrix} s_{s,11} & \cdots & s_{s,1n} \\ \vdots & \ddots & \vdots \\ s_{s,m1} & \cdots & s_{s,mn} \end{bmatrix}$$

The optimized activation pattern u* over the determined time horizon T or the prediction horizon H can thus be described as follows:

$$u^* = \begin{bmatrix} \begin{bmatrix} s_{s,11} & \cdots & s_{s,1n} \\ \vdots & \ddots & \vdots \\ s_{s,m1} & \cdots & s_{s,mn} \end{bmatrix}_1, \begin{bmatrix} s_{s,11} & \cdots & s_{s,1n} \\ \vdots & \ddots & \vdots \\ s_{s,m1} & \cdots & s_{s,mn} \end{bmatrix}_2, \ldots, \begin{bmatrix} s_{s,11} & \cdots & s_{s,1n} \\ \vdots & \ddots & \vdots \\ s_{s,m1} & \cdots & s_{s,mn} \end{bmatrix}_H \end{bmatrix}$$

If the switching state $s_{s,ki}$ of the first switching element 42 is equal to one during operation of the battery pack 24, meaning that the first switching element 42 is closed, the switching state $s_{p,ki}$ of the second switching element 44 is equal to zero, which means that the second switching element 44 is open.

The activation pattern u for actuating the switching units 40 is a binary matrix, which describes the switching states of the first switching elements 42 of the respective battery cells 2, i.e. whether the respective battery cells 2 are connected or disconnected. In this case, the activation pattern u can also comprise the switching states of the second switching elements 44 of the respective battery cells 2.

Figure 4:
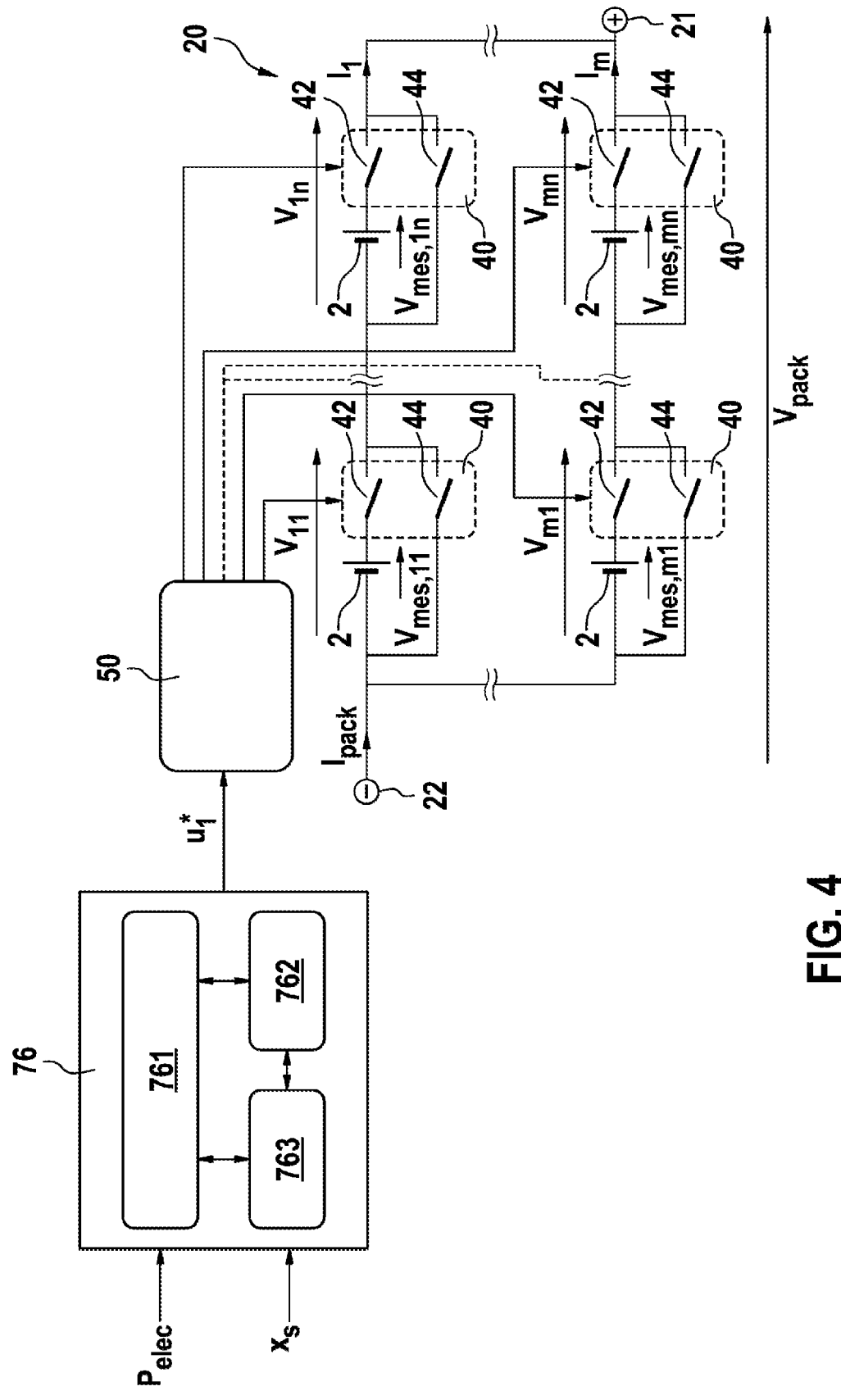
FIG. 4 is a schematic view of model predictive control for actuating the switching units.

FIG. 4 shows a schematic view of model predictive control 76 for actuating the switching units 40. FIG. 4 shows that the switching units 40 are actuated with the aid of model predictive control 76, in order to cover the predicted electrical power requirement $P_{elec}$. In this case, a number of battery cells 2 is selected for discharging, in order to meet the requested power during the journey. During a braking phase, an energy recovery process takes place by selecting battery cells 2 to be activated in order to maximize the charging power.

In the present case, model predictive control 76 is used in order to expediently use the predicted electrical power requirement $P_{elec}$ in FIG. 4. The model predictive control 76 optimizes the activation pattern u of the switching unit 40 over the same determined time horizon T provided by the GPS module 12. The optimized activation pattern u* denotes the optimized states of the individual switching units 40 over the determined time horizon T. In this case, the switching units 40 are actuated by a gate driver module 50 at each time step dt within the determined time horizon T. In this case, the model predictive control 76 uses the predicted electrical power requirement $P_{elec}$ and the estimated state $x_s$ of the battery pack 24 as input variables. In this case, the model predictive control 76 comprises an objective function and condition module 761, an optimization module 762 and a simulation model 763, in order to optimize the activation pattern u. The simulation model 763 of the battery pack 24 aims to estimate the electrical, thermal and aging behavior of the battery pack 24.

In the present case, the model predictive control 76 is performed on the basis of a Pareto optimization, which is formulated as follows:

$$u = \underset{u}{\arg\min} J(x_s(t), u)$$

which is dependent on the following equations:

$$\dot{x}(t) = f_{sim}(x(t),u),$$

$$y(t) = g_{sim}(x(t),u),$$

$$y_{lb} \leq y(t) \leq y_{ub},$$

and $$u \in \{0,1\}.$$

In this case, the optimization problem at the beginning of the method according to the invention is initialized with an initial activation pattern $u_0$, which is defined as follows:

$$u_0 = \begin{bmatrix} 0 & \cdots & 0 \\ \vdots & \ddots & \vdots \\ 0 & \cdots & 0 \end{bmatrix}$$

The initial activation pattern $u_0$ means that the battery pack 24 is disconnected.

In this case, J is the scalar objective function, which is defined as follows:

$$J = \sum_{k=1}^{H}\left(\sum_{i=1}^{N}\gamma_i \cdot J_i\right)$$

In this case, k=1, . . . , H and H are the prediction horizon. N is the number of objectives to be met, such as power requirement, temperature and/or state of health. In this case, $\gamma_i \geq 0$ are the consideration weightings indicating the relative importance of the individual objectives. These consideration weightings are selected such that the desired compromise between all objectives is achieved, i.e.

$$\sum_{i}^{N}\gamma_i = 1.$$

In the following, the highlighted conflicting objectives can be:

$J_{pw}$, in order to cover the predicted electrical power requirement $P_{elec}$, $J_{temp}$, in order to reduce the temperature deviations within the battery cells 2 and the average battery temperature, $J_{SoC}$, in order to reduce the SoC imbalance within the cells, $J_{SoH}$, in order to ensure uniform aging and minimize degradation, and $J_{u}$, in order to minimize the switching rate.

The equations of $\dot{x}(t)$ and $y(t)$ describe the dynamics of the simulation model 763 of the battery pack 24. The equations of $y_{lb} \leq y(t) \leq y_{ub}$ and $u \in \{0,1\}$ specify the boundary conditions for the output of the simulation model 763, such as voltages, current and temperatures, and the activation pattern u. In this case, $y_{lb}$ and $y_{ub}$ are the limitations of the battery pack 24, such as the voltage and current limits of the battery pack 24, as well as the voltage and current limits of the respective strings 26, if the battery pack 24 comprises a plurality of strings 26 connected in parallel, the state of charge and state of health limits, and the temperature limit and deviation, etc.

The model predictive control 76 optimizes the activation pattern u in each time step dt. According to the regressive horizon, only the first optimal activation pattern $u_1^*$ is applied to the battery pack 24.

The invention is not limited to the embodiments described here and the aspects emphasized therein. Rather, a large number of modifications are possible within the range indicated by the claims, which are within the scope of the activities of a person skilled in the art.

The invention claimed is:

1. A method for monitoring and controlling a battery pack (24) of a vehicle (10), which battery pack comprises a plurality of battery cells (2) interconnected in parallel and/or in series, the battery cells (2) each comprising a switching unit (40) which serves to connect and disconnect the respective battery cells (2) separately, the method comprising the steps of:

acquiring, via one or more sensors, pack information of the battery pack (24), the pack information comprising at least cell voltages ($V_{mes}$), cell temperature ($T_{mes}$) of the respective battery cells (2), and a pack current ($I_{pack,mes}$);

calculating a pack voltage ($V_{pack}$) of the battery pack (24) on the basis of the cell voltages ($V_{mes}$) of the respective battery cells (2) and a current activation pattern (u) for actuating the switching units (40);

predicting, via a power prediction module (14), an electrical power requirement ($P_{elec}$) of the vehicle (10) based on information GPS Info acquired by a GPS module (12), wherein the information $GPS_{Info}$ includes a speed and location of the vehicle (10);

estimating, via a state estimation module (60), the state ($x_s$) of the battery pack (24) based on the pack information and the current activation pattern (u);

calculating, via a control device, an optimized activation pattern (u*) for actuating the switching units (40) on the basis of the predicted electrical power requirement ($P_{elec}$) and the estimated state ($x_s$) of the battery pack (24); and actuating, via the control device, the switching units (40) of the respective battery cells (2) according to the optimized activation pattern (u*) for actuating the switching units (40) for connecting and disconnecting the respective battery cells (2).

2. The method according to claim 1, wherein the optimized activation pattern (u*) is calculated by means of model predictive control (76).

3. The method according to claim 2, wherein the model predictive control (76) is performed based on Pareto optimization.

4. A system (100) for monitoring and controlling a battery pack (24) of a vehicle (10), which battery pack comprises a plurality of battery cells (2) interconnected in parallel and/or in series, the battery cells (2) each comprising a switching unit (40) which serves to connect and disconnect the respective battery cells (2) separately, the system (100) comprising:

a GPS module (12) of the vehicle (10), a power prediction module (14) configured to predict an electrical power requirement ($P_{elec}$) of the vehicle (10) on the basis of information $GPS_{Info}$ acquired by the GPS module (12), wherein the information $GPS_{Info}$ includes a speed and location of the vehicle (10), a state estimation module (60) configured to estimate a state ($x_s$) of the battery pack (24) on the basis of pack information, and a control device (70) configured to calculate an optimized activation pattern (u*) for actuating the switching units (40) on the basis of the predicted electrical power requirement ($P_{elec}$) and the estimated state ($x_s$) of the battery pack (24), and to actuate the switching units (40) of the respective battery cells (2) according to the optimized activation pattern (u*) for actuating the switching units (40) for connecting and disconnecting the respective battery cells (2).

5. A battery management system for monitoring and controlling a battery system (20) of a vehicle (10), which battery system comprises at least one battery pack (24) having a plurality of battery cells (2) interconnected in parallel and/or in series, each comprising a switching unit (40) which serves to connect and disconnect the respective battery cells (2) separately, the battery management system comprising:

a power prediction module (14) configured to predict an electrical power requirement ($P_{elec}$) of the vehicle (10) based on information GPS Info acquired by the GPS module (12), wherein the information $GPS_{Info}$ includes a speed and location of the vehicle (10), a state estimation module (60) configured to estimate a state ($x_s$) of the at least one battery pack (24), and a control device (70) configured to calculate an optimized activation pattern (u*) for actuating the switching units (40) on the basis of the predicted electrical power requirement ($P_{elec}$) and the estimated state ($x_s$) of the at least one battery pack (24), and to actuate the switching units (40) of the respective battery cells (2) according to the optimized activation pattern (u*) for actuating the switching units (40) for connecting and disconnecting the respective battery cells (2).

6. A battery system (20) of a vehicle (10), comprising at least one battery pack (24) having a plurality of battery cells (2) interconnected in parallel and/or in series, each comprising a switching unit (40) which serves to connect and disconnect the respective battery cells (2) separately, wherein the battery system (20) is configured to predict an electrical power requirement ($P_{elec}$) of the vehicle (10) on the basis of information $GPS_{Info}$ acquired via a GPS module (12), wherein the information $GPS_{Info}$ includes a speed and location of the vehicle (10), estimate a state ($x_s$) of the battery pack (24) on the basis of pack information, and calculate an optimized activation pattern (u*) for actuating the switching units (40) on the basis of the predicted electrical power requirement ($P_{elec}$) and the estimated state ($x_s$) of the battery pack (24), and to actuate switching units (40) of the respective battery cells (2) according to the optimized activation pattern (u*) for actuating the switching units (40) for connecting and disconnecting the respective battery cells (2).

7. The battery system (20) according to claim 6, wherein the at least one battery pack (24) comprises one or more strings (26) of battery cells (2) which are interconnected in series within the respective strings (26).

8. The battery system (20) according to claim 6, wherein the switching units (40) each comprise a first switching element (42) and a second switching element (44), the first switching element (42) and the corresponding battery cell (2) forming a series circuit (30), and the second switching element (44) being connected in parallel with the series circuit (30).

9. The battery system (20) according to claim 8, wherein the first and the second switching element (42, 44) are each designed as semiconductor switches.

10. A vehicle (10) comprising

A battery pack having a plurality of battery cells (2) interconnected in parallel and/or in series, the battery cells (2) each comprising a switching unit (40) which serves to connect and disconnect the respective battery cells (2) separately, the vehicle configured to:

acquire, via one or more sensors, pack information of the battery pack (24), the pack information comprising at least cell voltages ($V_{mes}$), cell temperature ($T_{mes}$) of the respective battery cells (2), and a pack current ($I_{pack, mes}$);

calculate a pack voltage ($V_{pack}$) of the battery pack (24) on the basis of the cell voltages ($V_{mes}$) of the respective battery cells (2) and a current activation pattern (u) for actuating the switching units (40);

predict, via a power prediction module (14), an electrical power requirement ($P_{elec}$) of the vehicle (10) based on information GPS Info acquired by a GPS module (12) of the vehicle (10), wherein the information $GPS_{Info}$ includes a speed and location of the vehicle (10);

estimate, via a state estimation module (60), the state ($x_s$) of the battery pack (24) based on the pack information and the current activation pattern (u);

calculate, via a control device, an optimized activation pattern (u*) for actuating the switching units (40) on the basis of the predicted electrical power requirement ($P_{elec}$) and the estimated state ($x_s$) of the battery pack (24); and actuate, via the control device, the switching units (40) of the respective battery cells (2) according to the optimized activation pattern (u*) for actuating the switching units (40) for connecting and disconnecting the respective battery cells (2).

\* \* \* \* \*